United States Patent [19]

Sharp et al.

[11] Patent Number: 4,600,332
[45] Date of Patent: Jul. 15, 1986

[54] ALUMINUM/TITANIUM TRANSITION JOINT BETWEEN ALUMINUM AND STEEL BODIES

[75] Inventors: William F. Sharp, Louisville; John G. Banker, Boulder; Roy Hardwick, Louisville, all of Colo.

[73] Assignee: Explosive Fabricators, Inc., Louisville, Colo.

[21] Appl. No.: 690,605

[22] Filed: Jan. 11, 1985

[51] Int. Cl.⁴ .................................. F16B 35/00
[52] U.S. Cl. ........................ 403/179; 403/271; 403/29; 228/140; 228/175; 29/526 R; 411/180; 411/171
[58] Field of Search ............ 228/175, 107, 108, 109, 228/140; 29/526; 411/171, 177, 179, 180, 432, 427, 901, 902; 403/179, 404, 271, 272, 29, 365, 366; 114/83

[56] References Cited

U.S. PATENT DOCUMENTS

| | | | |
|---|---|---|---|
| 2,426,653 | 9/1947 | Whelan et al. | 403/272 X |
| 3,129,444 | 4/1964 | Kahn | 411/180 X |
| 3,331,121 | 7/1967 | DeMaris et al. | 228/108 |
| 3,418,869 | 12/1968 | Herpich | 411/546 X |
| 3,875,326 | 4/1975 | Hofer | 228/107 X |
| 3,919,761 | 11/1975 | Bomberger, Jr. | 228/140 X |
| 4,292,876 | 10/1981 | DeGraan | 411/901 X |
| 4,523,710 | 6/1985 | Renshaw et al. | 228/140 X |

FOREIGN PATENT DOCUMENTS 2108030  5/1983  United Kingdom ............... 228/107

Primary Examiner—Cornelius J. Husar
Assistant Examiner—Joseph A. Fischetti
Attorney, Agent, or Firm—Gary M. Polumbus

[57] ABSTRACT

A strong transition joint between an aluminum plate and a steel object includes an aluminum sleeve adapted to be fusion-welded to the aluminum plate and a titanium core explosion-welded to the aluminum sleeve in the center thereof with the titanium core having an internally threaded hole adapted to receive a steel bolt so that the occurance and economic consequences of corrosion are minimized.

10 Claims, 8 Drawing Figures

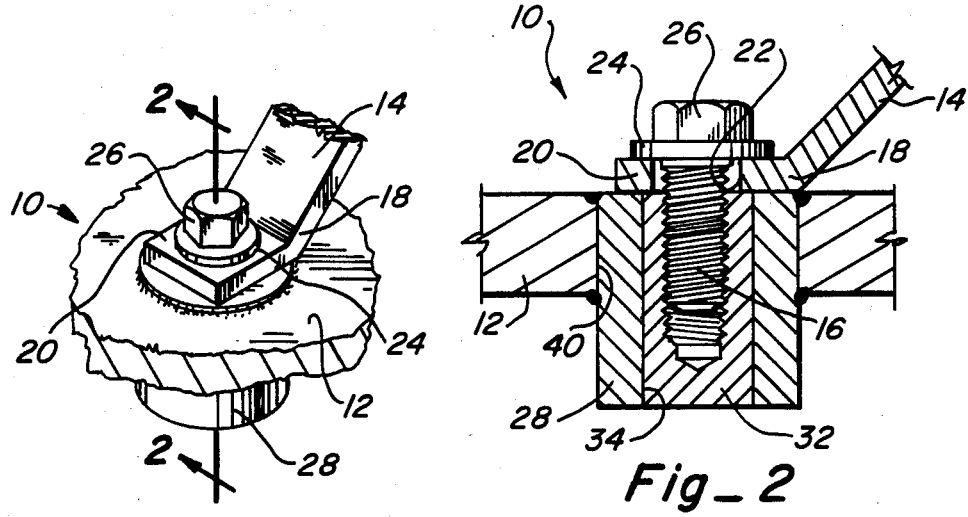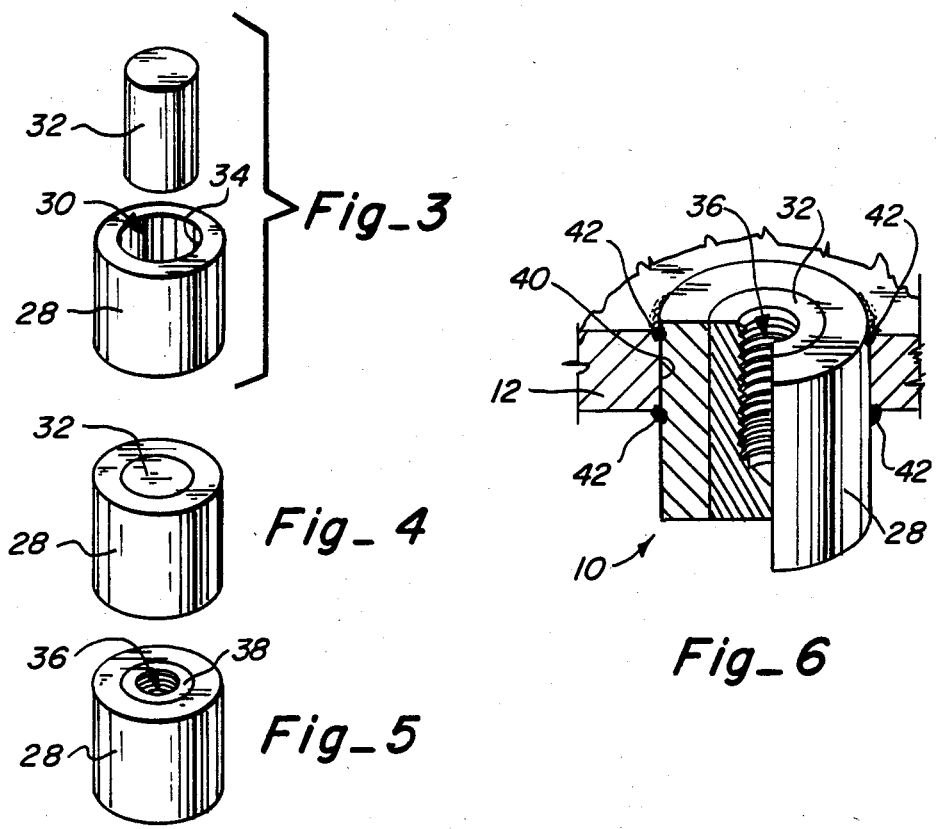

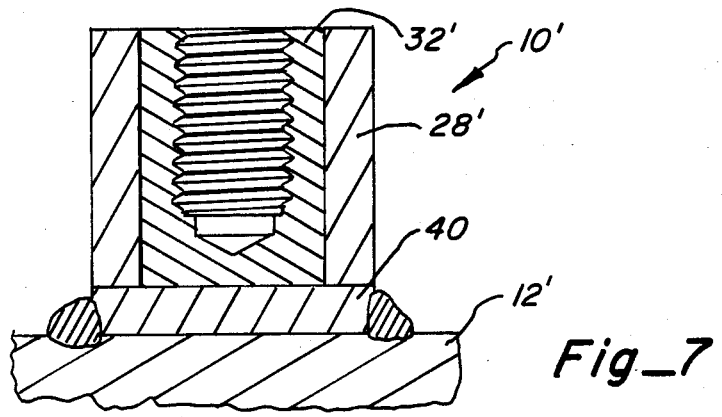
Fig_7
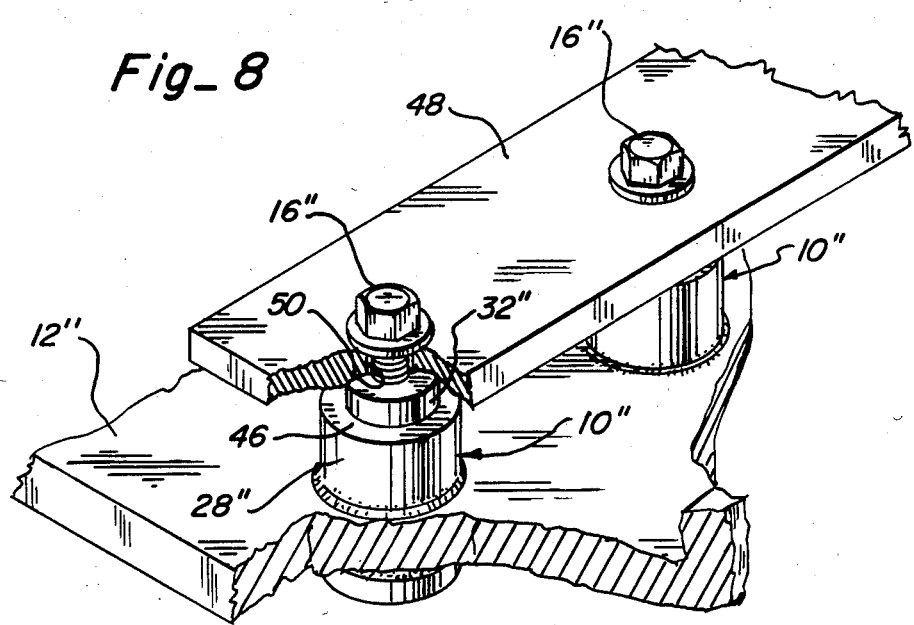
Fig_8

4,600,332

ALUMINUM/TITANIUM TRANSITION JOINT BETWEEN ALUMINUM AND STEEL BODIES

BACKGROUND OF THE INVENTION

1. Field of the Invention

The present invention relates generally to joints between aluminum and steel bodies and more particularly, to a strong joint capable of withstanding large tensile forces while minimizing corrosion problems.

2. Description of the Prior Art

Steel and aluminum materials frequently need to be joined in applications where the particular characteristics of each of the two metals are desirable for various reasons. For example, steel is known to be a stronger material than aluminum, while aluminum is lighter than steel. So in instances where strength and weight are critical parameters, aluminum may be employed to keep the weight down, while steel is employed to give added strength. It is known, however, that steel cannot be fusion-welded to aluminum and accordingly, other methods of joining the two materials have been developed. A mechanical connection sometimes provides the desired strength, but presents a problem of oxidation and/or galvanic corrosion due to the exposure of the crevice at the aluminum/steel joint to environmental elements. It has been demonstrated that an explosion-welded joint, by eliminating the crevice between the steel and aluminum, reduces the rate of corrosion to acceptable levels. The explosion-welding technique cannot always be employed at all locations, thereby necessitating a modification of the steel and aluminum components to facilitate an explosion-welding process. Explosion-welding is a known technique and is fully described in U.S. Pat. No. 3,137,937 issued to G. R. Cowan, et al. on June 23, 1964, and U.S. Pat. No. 3,364,561 issued to J. Barrington on Jan. 23, 1968.

An illustration of an instance wherein aluminum and steel are joined for practical reasons, is in modern-ship design which makes extensive use of aluminum structural components for weight reduction, while utilizing steel for structural components that require greater strength or toughness. As mentioned previously, the joining of aluminum and steel components presents a design problem in that the two metals cannot be directly fusion-welded to one another. Any mechanical joint creates a problem with galvanic corrosion in the crevice between the two components. A typical situation where the problem occurs is in the joining of aluminum super structures to steel decks. This design has been employed extensively by the United States Navy in warships.

For approximately the last 15 years, the problem of galvanic corrosion in aluminum/steel joints has been avoided by the use of explosion-welded tri-metallic transition joints. This system employs a plate or bar composed of a layer of steel, a layer of pure aluminum, and a layer of an aluminum alloy being used in the ship structure. The layer of aluminum is required to improve the strength of the joint as explosion welds between steel and aluminum alloys do not result in a very strong joint.

The steel/aluminum/aluminum alloy joint solves the corrosion problem and has proven satisfactory in situations where components are to be held together with only moderate separating forces, such as pulling forces, being applied and where the joined components do not need to be disassembled for maintenance or other purposes. However, in situations where concentrated separating forces are applied, the steel/aluminum/aluminum alloy joint is not satisfactory because the joint is welded to the components. An example of such a situation is the need to attach helicopter recovery systems to aluminum decks using high strength steel bolts. Rough sea recovery operations exert very high pulling forces on the recovery system and accordingly, a very strong joint to the deck is required. Additionally, the recovery system requires periodic disassembly for system maintenance.

A primary objective of the present invention is, therefore, to provide a strong transition joint between an aluminum plate and a steel object such as a bolt.

A second objective is to make a joint that provides easy disassembly of the joined components.

A third objective is to make the joint highly resistant to galvanic and atmospheric corrosion.

SUMMARY OF THE INVENTION

The transition joint of the present invention consists of an aluminum sleeve which is explosively bonded to the outside of an internal core of titanium having an internally threaded hole therein adapted to receive a steel bolt. The aluminum sleeve can be fusion welded along its outside periphery to an aluminum body.

As can be appreciated, the transition joint is bi-metallic as opposed to tri-metallic in nature, as has been the case in previous transition joints of this type, thereby minimizing the cost of the joint while providing a very high strength joint which controls galvanic corrosion and oxidation.

Other objects, advantages and capabilities of the present invention will become more apparent as the description proceeds when taken in conjunction with the accompanying drawings.

BRIEF DESCRIPTION OF THE DRAWINGS

FIG. 1 is a fragmentary perspective view of the transition joint of the present invention establishing a connection between a steel bolt and an aluminum plate.

FIG. 2 is an enlarged verticle section taken along line 2—2 of FIG. 1.

FIG. 3 is an exploded perspective view of the transition joint of the present invention before the titanium core is internally threaded.

FIG. 4 is a perspective view of the transition joint of the present invention before the titanium core is internally threaded.

FIG. 5 is a perspective view of the transition joint as illustrated in FIG. 4 with the titanium core having been internally threaded.

FIG. 6 is a fragmentary perspective view in quarter section illustrating the transition joint disposed in a hole in an aluminum plate.

FIG. 7 is a full longitudinal section taken through a second embodiment of the present invention.

FIG. 8 is a fragmentary isometric view of a third embodiment of the present invention with parts removed for clarity.

DESCRIPTION OF THE PREFERRED EMBODIMENT

Referring first to FIGS. 1 and 2, the transition joint 10 of the present invention is seen positioned in an aluminum plate 12 with a steel strap 14 being secured to the transition joint by a steel bolt 16. The steel strap 14 is illustrated as having a bend 18 therein, forming an attachment foot 20 which has a hole 22 therethrough adapted to receive the steel bolt 16. A washer 24 is positioned on top of the foot portion 20 of the steel strap so that the head 26 of the steel bolt can be seated on the washer in a positive manner.

The transition joint 10 itself consists of a tubular aluminum component or sleeve 28 which is open at both ends, defining a cylindrical internal space 30 in which a solid cylindrical titanium core 32 is positioned. The titanium core is secured or clad to the internal surface 34 of the aluminum sleeve 28 as by an explosive-welding process well known in the art so that the ends of the sleeve 28 and the core 32 are respectively coplanar. The titanium core 32 has a threaded axially aligned blind hole 36 opening through an upper end 38 thereof which is adapted to receive the steel bolt 16, whereby the steel strap can be releasably, but tightly secured, to the transition joint.

The aluminum sleeve 28 is secured in a circular opening 40 provided in the aluminum plate 12 in any suitable manner, such as by a fusion-weld 42. This fusion-weld is preferably provided along, both the upper and lower surfaces of the aluminum plate.

It should be noted that the transition joint 10 limits corrosion related problems in two ways. (1) The explosion bond between aluminum and titanium eliminates the crevice and thus limits the spread of corrosion, and (2) the use of titanium minimizes the consequences of corrosion between the transition joint and the steel bolt. Although there is a crevice between the steel bolt and the titanium that will allow corrosion to occur, the steel bolt is the sacrificial material. Therefore, the corrosion will occur in the easily replaceable steel bolt while the permanently installed titanium will not corrode. Furthermore, when the joint 10 is not in use and yet permanently positioned in the aluminum plate, no atmospheric corrosion occurs due to the fact that titanium is non-corrosive in a salt water/salt spray atmosphere.

The use of titanium, not only enables the joint to resist and control galvanic corrosion and oxidation, but further provides a high strength connection between a steel component, such as a steel bolt, and an aluminum plate whereby large tensile forces can be withstood without endangering the juncture of the steel and aluminum components.

To applicant's acknowledge titanium has not previously been used for this purpose, but rather has only been used for bonding strength in explosive-welded joints.

Referring to FIGS. 3, 4 and 5, the procedure for fabricating the transition joint 10 is illustrated with FIG. 3 showing the titanium core 32 prior to insertion into the cylindrical opening 30 of the aluminum sleeve 28. Once the titanium core has been inserted into the cylindrical opening in the aluminum sleeve as illustrated in FIG. 4, explosive material (not shown) is wrapped around the exterior of the sleeve, and detonated to establish an actual metallurgical welding of the metals for a very positive and strong bond. While the procedure for explosive-welding is well known and described in the prior art, suffice it to say that the titanium core has a very slightly smaller outside diameter than the internal diameter of the aluminum sleeve, so that upon detonation of the explosive material, the aluminum sleeve is actually driven into the exterior surface of the titanium core at such a high velocity that electron sharing takes place.

Once the titanium core 32 has been secured within the aluminum sleeve 28, or prior to insertion of the titantium core into the aluminum sleeve, the threaded axially aligned hole 36 is provided in the titanium core so that it opens through the upper end 28 thereof. The completed transition joint is illustrated if FIG. 5 prior to its placement in the aluminum plate 12 or the like as illustrated in FIGS. 1, 2 and 6.

In a second embodiment of the invention illustrated in FIG. 7, with like parts having been given like reference numerals with a prime suffix, the transition joint 10' is seated on the face of an aluminum plate 12' as opposed to being received in an opening 40 provided in the plate as in the first described embodiment. A circular bottom cap 44' of aluminum is fusion welded to the lower edge of the aluminum sleeve 28' to prevent a crevice from being formed between the lower end of the titanium core 32' and the aluminum plate 12' thereby minimizing the spread of corrosion.

In a third embodiment of the invention as illustrated in FIG. 8 with like parts having been given like reference numerals with a double prime suffix, the transition joint 10" is again an aluminum sleeve 28" which is explosively bonded to a titanium core 32" but in this embodiment, the aluminum sleeve is stripped back along its upper edge so that the titanium core protrudes upwardly a small amount to define an annular shoulder 46. This embodiment may be used in a situation where a steel plate 48 is to be connected in spaced relationship to the aluminum plate 12".

The transition joint 10" is secured in an opening through the aluminum plate 12" as by fusion welding the sleeve 28" to the aluminum plate 12" along both the top and bottom surfaces of the plate such that the joint 10" protrudes upwardly from the aluminum plate. The steel plate 48 is provided with an opening 50 therethrough and rests on the protruding upper end of the titanium core 32" so that the steel plate does not contract the aluminum sleeve 28" thus avoiding the formation of a small crevice between the steel and aluminum where corrosion would be encouraged. The steel plate, of course, is secured to the transition joint by a stud bolt 16". This embodiment of the present invention finds utility in the mounting of steel tracks on aluminum decks of naval ships.

Although the present invention has been described with a certain degree of particularity, it is understood that the present disclosurre has been made by way of example, and that changes in detail or structure may be made without departing from the spirit of the invention, as defined in the appended claims.

What is claimed is:

1. A transition joint between an aluminum body and a steel object to be joined to the aluminum body comprising in combination:
   an aluminum component secured to the aluminum body, said aluminum component having an internal space provided therein, and
   a titanium core secured in the internal space of said aluminum component, said titanium core including joinder means for being joined to said steel object.

2. The transition joint of claim 1 wherein said aluminum component is cylindrical in configuration and said aluminum body has a cylindrical opening in which said aluminum component is matingly received.

3. The transition joint of claim 2 wherein the internal space in said aluminum component is cylindrical and wherein said titanium core is cylindrical in configuration and is matingly seated in the cylindrical space of said aluminum component.

4. The transition joint of claim 3 wherein said titanium core is explosively bonded to said aluminum component.

5. The transition joint of claim 3 wherein said joinder means of said titanium core is a threaded hole in the core and wherein said steel object is externally threaded for removable connection to said titanium core.

6. The transition joint of claim 4 wherein said aluminum component is fusion-welded to said aluminum body.

7. The transition joint of claim 1 wherein the aluminum component has opposite ends and the titanium core has corresponding opposite ends with the associated ends of said aluminum component and has titanium core being coplanar.

8. The transition joint of claim 7 further including a aluminum cap across one end of said aluminum sleeve to enclose the titanium core at that end of the transition joint.

9. The transition joint of claim 1 wherein the aluminum component has opposite ends and the titanium core has corresponding opposite ends, with one end of the titanium core protruding beyond the associated end of the aluminum component so as to be displaced therefrom.

10. A transition joint between an aluminum plate having a cylindrical recessed opening therein and an externally threaded steel bolt comprising in combination:
a tubular aluminum sleeve seated in said recessed opening and having an outside diameter substantially the same as the diameter of said recessed opening, said sleeve being welded to said aluminum plate, and
a cylindrical titanium core having an outside diameter substantially the same as the inside diameter of said aluminum sleeve, said titanium core being explosion-welded to said aluminum sleeve and having an internally threaded opening adapted to threadedly receive the steel bolt to thereby provide a releasable connection between the steel bolt and the aluminum plate.

* * * * *